United States Patent
Okuda

(10) Patent No.: US 9,020,492 B2
(45) Date of Patent: Apr. 28, 2015

(54) MOBILE COMMUNICATION SYSTEM, COMMUNICATION CONTROL APPARATUS, COMMUNICATION CONTROL METHOD AND WIRELESS BASE STATION

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 416 days.

(21) Appl. No.: 13/271,616

(22) Filed: Oct. 12, 2011

(65) Prior Publication Data

US 2012/0094653 A1 Apr. 19, 2012

(30) Foreign Application Priority Data

Oct. 13, 2010 (JP) ................................. 2010-230571

(51) Int. Cl.
*H04W 24/00* (2009.01)
*H04W 24/02* (2009.01)
*H04W 16/32* (2009.01)
*H04W 24/10* (2009.01)
*H04W 84/04* (2009.01)

(52) U.S. Cl.
CPC .............. *H04W 24/02* (2013.01); *H04W 16/32* (2013.01); *H04W 24/10* (2013.01); *H04W 84/045* (2013.01)

(58) Field of Classification Search
CPC ............................. H04W 84/14; H04W 24/10
USPC ................... 455/422.1, 423, 447; 370/252
See application file for complete search history.

(56) References Cited

U.S. PATENT DOCUMENTS

| | | | |
|---|---|---|---|
| 8,599,699 B2 * | 12/2013 | Hirano et al. | 370/239 |
| 2009/0239547 A1 * | 9/2009 | Nitta et al. | 455/452.2 |
| 2010/0105377 A1 | 4/2010 | Iwamura et al. | |
| 2011/0028144 A1 * | 2/2011 | Catovic et al. | 455/423 |
| 2011/0051684 A1 * | 3/2011 | Li et al. | 370/331 |
| 2011/0164660 A1 | 7/2011 | Hosono | |

FOREIGN PATENT DOCUMENTS

| | | |
|---|---|---|
| JP | 9-261159 A | 10/1997 |
| JP | 2001-128227 A | 5/2001 |
| JP | 2004-48490 A | 2/2004 |
| JP | 2007-129405 A | 5/2007 |
| JP | 2008-172380 A | 7/2008 |
| WO | 2009/148162 A1 | 12/2009 |

OTHER PUBLICATIONS

Office Action of Japanese Patent Application No. 2010-230571 dated Feb. 18, 2014, with Partial Translation.

* cited by examiner

*Primary Examiner* — Amancio Gonzalez
(74) *Attorney, Agent, or Firm* — Fujitsu Patent Center

(57) ABSTRACT

A mobile communication system including: a first wireless base station; a second wireless base station located within a service area of the first wireless base station and configured to have a service area smaller than the service area of the first wireless base station; a wireless terminal configured to couple to the first or second wireless base stations; and a communication control apparatus; wherein the communication control apparatus controls adjustment of communication parameters of the first wireless base station, instructs the second wireless base station whose communication parameters have been changed to measure a wireless quality of the first wireless base station when changes to the communication parameters of the first wireless base station have occurred, obtains the wireless quality measured by the second wireless base station, and determines whether the communication parameters of the first wireless base station were adjusted based on the wireless quality.

13 Claims, 18 Drawing Sheets

FIG. 8

| fBS ID | POSITION INFORMATION (LATITUDE, LONGITUDE) | OVERLAPPING mBS |
|---|---|---|
| fBS#A | LAT#a,LNG#a | mBS#X |
| fBS#B | LAT#b,LNG#b | mBS#Y |
| ... | ... | ... |

| POSITION INFORMATION (LATITUDE, LONGITUDE) | WIRELESS QUALITY | mBS |
|---|---|---|
| LAT#a, LNG#a | -70dBm | mBS#X |
| LAT#b, LNG#b | -84dBm | mBS#Y |
| ... | ... | ... |

| POSITION INFORMATION (LATITUDE, LONGITUDE) | WIRELESS QUALITY | | mBS |
| --- | --- | --- | --- |
| | BEFORE ADJUSTMENT | AFTER ADJUSTMENT | |
| LAT#a, LNG#a | -70dBm | -60dBm | mBS#X |
| LAT#b, LNG#b | -84dBm | -92dBm | mBS#Y |
| ... | ... | ... | ... |

FIG. 14

| UE ID | POSITION INFORMATION (LATITUDE, LONGITUDE) | CONNECTED BS |
|---|---|---|
| UE#A | LAT#a,LNG#a | mBS#X |
| UE#B | LAT#b,LNG#b | mBS#Y |
| ... | ... | ... |

FIG. 17

| POSITION INFORMATION (LATITUDE, LONGITUDE) | DEFECT INFORMATION |
|---|---|
| LAT#A,LNG#a | LINK DISCONNECTION |
| LAT#B,LNG#b | QUALITY DETERIORATION |
| ... | ... |

421

MOBILE COMMUNICATION SYSTEM, COMMUNICATION CONTROL APPARATUS, COMMUNICATION CONTROL METHOD AND WIRELESS BASE STATION

CROSS-REFERENCE TO RELATED APPLICATION

This application is based upon and claims the benefit of priority from the prior Japanese Patent Application No. 2010-230571 filed on Oct. 13, 2010, the entire contents of which are incorporated herein by reference.

FIELD

Embodiments of the present invention relate to the technical field of measuring the signal strength of wireless base stations and a method for setting wireless parameters for communication.

BACKGROUND

In mobile communication systems, much research on Self-Organizing Networks (SON) for autonomous setting of communication parameters for wireless base stations is being conducted due to the complexity of wireless network operations. One of the objectives of SON is to optimize coverage (in other words, a service area) by using wireless base stations.

Coverage can be optimized in SON by eliminating blind zones (coverage holes) by adjusting the tilt angles of wireless base station antennas or by adjusting the transmission power and the like when, for example, such coverage holes where radio waves do not penetrate properly are present. To optimize coverage in this way, SON administration servers and the like in the wireless base stations or in the system need to understand the coverage conditions such as the presence of coverage holes for adjusting the tilt angles or transmission power.

Related art documents indicated below describe a technique of receiving reports of signal strength of wireless terminals measured by the host wireless base stations, and then detecting coverage holes based on the signal strength. Additionally, techniques for adjusting wireless base station communication parameters such as the tilt angles to eliminate detected coverage holes, and then determining the optimization results from wireless conditions after the adjustments are also mentioned.

Japanese Laid-open Patent Publication No. 2008-172380 is an example of related art.

SUMMARY

According to an aspect of the invention, a mobile communication system including: a first wireless base station; a second wireless base station located within a service area of the first wireless base station and configured to have a service area smaller than the service area of the first wireless base station; a wireless terminal configured to couple to the first or second wireless base stations; and a communication control apparatus configured to control the first or second wireless base stations; wherein the communication control apparatus controls adjustment of communication parameters of the first wireless base station, instructs the second wireless base station located inside the service area of the first wireless base station whose communication parameters have been changed to measure a wireless quality of the first wireless base station when changes to the communication parameters of the first wireless base station have occurred, obtains the wireless quality measured by the second wireless base station, and determines whether the communication parameters of the first wireless base station were adjusted based on the wireless quality, and the second wireless base station receives a measurement instruction to measure the wireless quality from the communication control apparatus; measures the wireless quality of the first wireless base station indicated in the measurement instruction from the communication control apparatus; and transmits the measured wireless quality to the communication control apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8 illustrates a fBS position database configuration.
FIGS. 9A and 9B illustrate wireless quality database configurations.
FIG. 14 illustrates a UE position database configuration
FIG. 17 illustrates a malfunction information database configuration.

DESCRIPTION OF EMBODIMENTS

According to the techniques described in the related art documents, wireless base station coverage conditions may be understood by receiving a report concerning signal strength from a wireless terminal. However, measurement information from multiple terminals needs to be received since not enough coverage information can be obtained from one wireless terminal. However in this case, there is a technical problem in that bandwidth for sending and receiving user data are reduced since wireless resources are spent for reporting the measurement information.

Moreover, even when coverage holes that are detected based on the measurement information received from the wireless terminals are eliminated by adjusting the wireless parameters, information on the wireless conditions after the adjustment cannot be obtained if no wireless terminals are present near the coverage holes after the elimination. As a result, the wireless base station cannot determine whether or not the optimization due to the adjustment was sufficient.

Embodiments of the present invention addresses the abovementioned technical issues (as well as others) by providing a mobile communication system, a communication control apparatus, a communication control method, and a wireless base station that appropriately understand coverage signal strength and appropriately compensate for detected coverage holes.

The following is an explanation of embodiments for achieving the present invention.

(1) Basic Configuration Example

Figure 1:
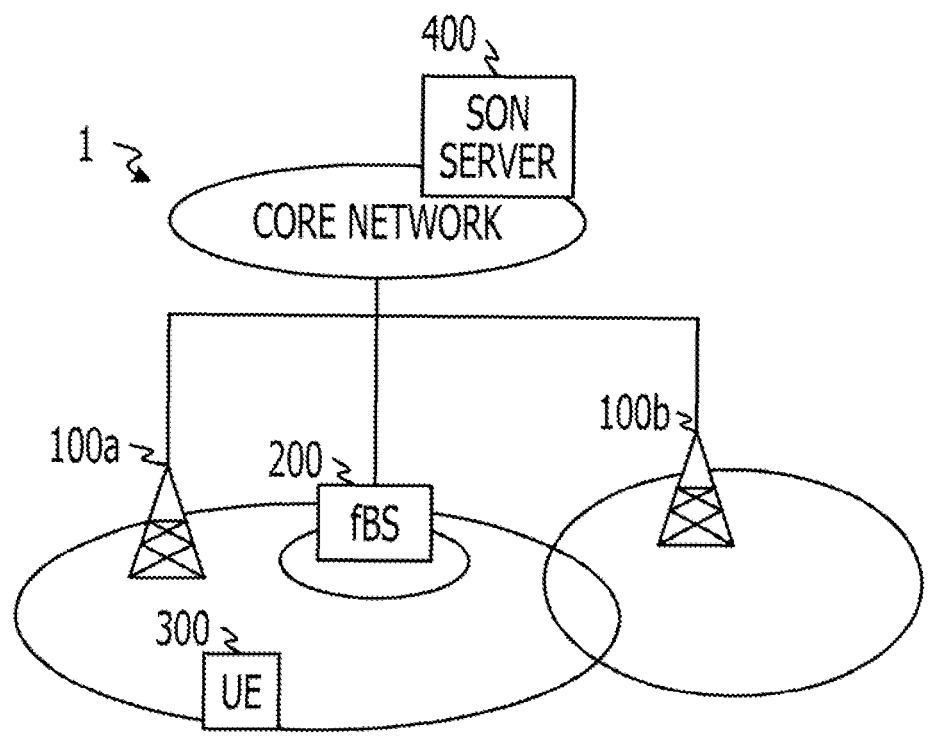
FIG. 1 illustrates a configuration of a mobile communication system.

A configuration of a mobile communication system 1 will be explained as an example of the disclosed mobile communication system with reference to FIG. 1. FIG. 1 is a block diagram illustrating the overall configuration of the mobile communication system 1 of the present embodiment. The mobile communication system 1 represents, for example, a wireless communication system complying with the Long Term Evolution (LTE) standard.

As illustrated in FIG. 1, the mobile communication system 1 is equipped with a SON server 400, macro Base Stations (mBS) 100a and 100b as examples of first wireless base stations, and a femto Base Station (fBS) 200 as an example of a second wireless base station provided in and overlapped by the service area (i.e., coverage area) of the mBS 100a.

The mBS 100a and 100b are, for example, wireless base stations called macro wireless base stations that cover a relatively wide service area with a radius of several hundred meters to several kilometers. The mBS 100a and 100b each form cells (e.g., macrocells) by transmitting transmission radio waves via below-mentioned antennas, and communicate with a UE 300 located inside the cell.

The fBS 200 is, for example, a wireless base station called a femto wireless base station that covers a relatively small service area such as a residence, a store, or a building floor. The fBS 200 forms a cell (e.g., femtocell) by transmitting transmission radio waves via a below-mentioned antenna, and communicates with a UE 300 located inside the cell.

The SON server 400 is an example of a disclosed communication control apparatus and is connected ("connect" may be replaced with "couple" hereafter) to the mBS 100a, the mBS 100b, and the fBS 200 base stations inside the mobile communication system 1 in a communicable state to communicate control signals for controlling operations.

The example described with reference to FIG. 1 refers to the mobile communication system 1 including two macro base stations mBS 100a and 100b and one femto base station fBS 200. However, the disclosed mobile communication system is not limited to this example and one or more macro base stations and one or more femto base stations may be included in the configuration. Moreover, when the mBS 100a and the mBS 100b are described without differentiation in the following description, the term mBS 100 may be used.

Additionally, the example described with reference to FIG. 1 refers to the mBS 100 as a base station forming a macrocell as an example of a first base station, and to the fBS 200 as a base station forming a femtocell as an example of a second base station. However, other base stations may be used as embodiments of the first and second base stations. For example, a microcell with transmission power lower than a macrocell may be used as an example of the second base station.

A basic configuration and basic functions of the fBS 200 will be described with reference to FIGS. 2 and 3.

Figure 2:
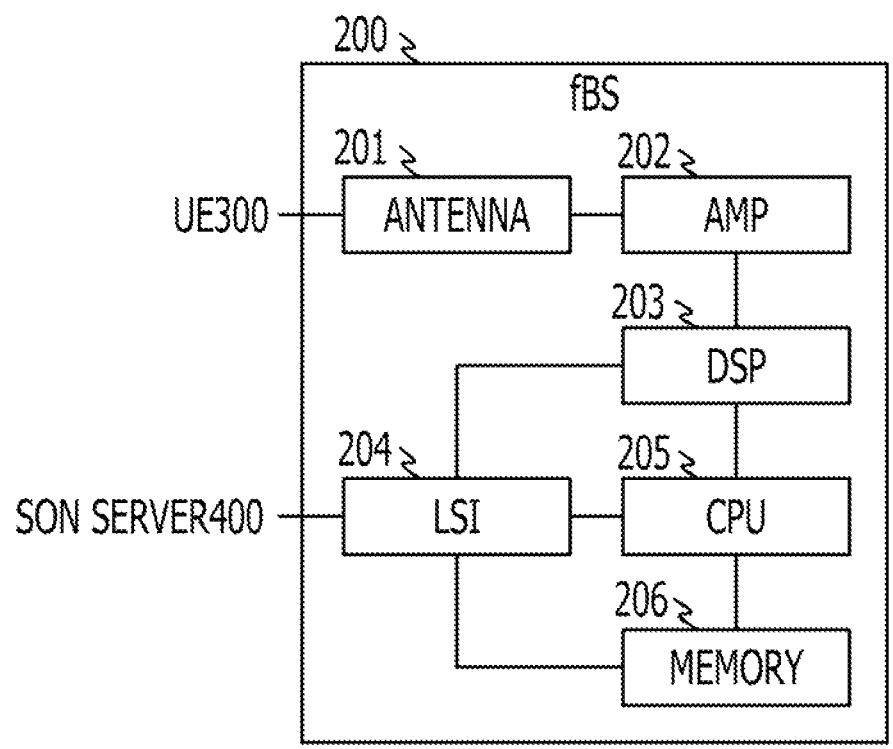
FIG. 2 is a block diagram of a fBS hardware configuration.

FIG. 2 is a block diagram of an example of a fBS 200 hardware configuration. The fBS 200 is equipped with an antenna 201, an amp 202, a digital signal processor (DSP) 203, a LSI 204, a CPU 205, and a memory 206. The antenna 201 is an antenna that transmits radio waves by forming a cell to conduct communication with a UE 300 located inside the cell. The amp 202 amplifies signals transmitted and received through the antenna 201. The DSP 203 performs conversion of information received via a network to a state for outputting the information from the antenna 201, and performs conversion of information received by the antenna 201 to a state for transmitting the information to the network. The LSI 204 is connected to the SON server 400 for conducting communication of information. At least a portion of the LSI 204 may include a Field Programmable Gate Array (FPGA). The CPU 205 controls the operations of the units in the fBS 200 and conducts various below-mentioned operations by executing programs stored in, for example, the memory 206.

Figure 3:
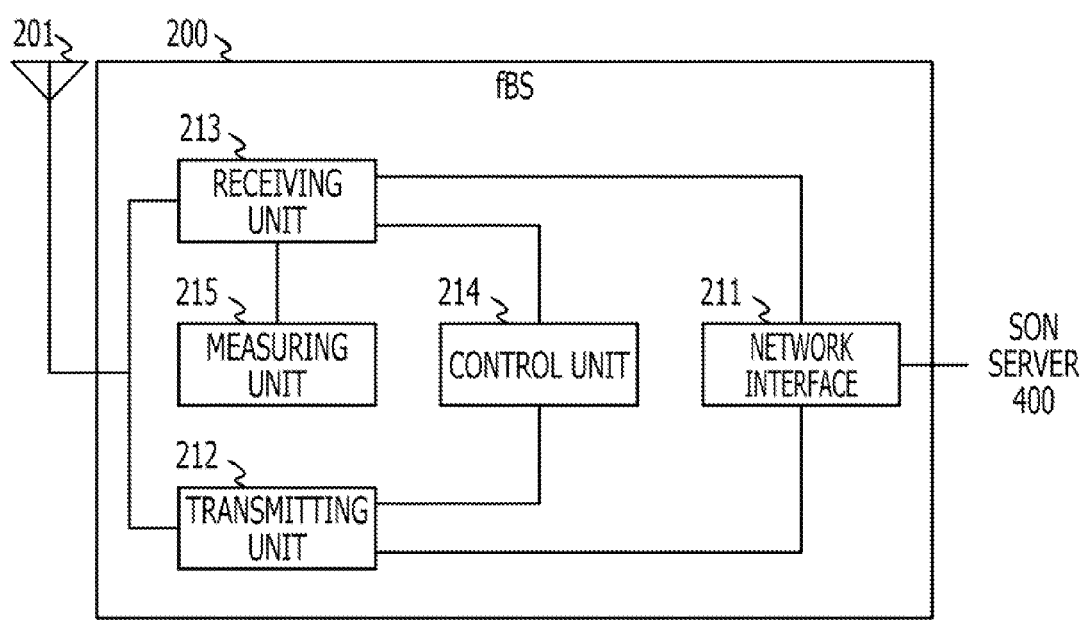
FIG. 3 is a block diagram of functional units included in a fBS.

FIG. 3 is a block diagram of functional units included in the fBS 200. The fBS 200 illustrated in FIG. 3 is equipped with a network interface 211 for coupling to a network, a transmitting unit 212 for transmitting data inputted from a network from an antenna 201 as wireless signals, a receiving unit 213 for receiving wireless signals received from the antenna 201, and a control unit 214 for controlling the transmitting unit 212 and the receiving unit 213, and for managing the UE 300 connected thereto.

The network interface 211 receives data such as Internet Protocol (IP) packets and the like from a network, and determines whether the data is addressed to the UE 300 controlled by the fBS 200, or addressed to the fBS 200, from header information of the IP packet. The network interface 211 transfers data addressed to the UE 300 to the transmission unit 212, and transfers data addressed to the fBS 200 to the control unit 214.

The transmission unit 212 encodes and modulates data received from the network interface 211 and transmits the data via the antenna 201.

The control unit 214 processes the data received from the network interface 211. For example, if the received data is an instruction transmitted from the SON server 400 to measure the mBS 100 signal strength, the control unit 214 instructs the receiving unit 213 to measure the radio waves transmitted by the mBS 100, then sends the results to the network interface 211 to allow the results to be transmitted back to the SON server 400.

The receiving unit 213 demodulates and decodes the signals received from the antenna 201 and transmits the data to the network interface 211. Additionally, when an instruction to measure the mBS 100 is received from the control unit 214, a measurement unit 215 measures information about the received signal strength such as SINR and received power of the transmission radio waves from the mBS 100, and then the results are transmitted to the control unit 214.

Further, to avoid interference, the control unit 214 may control the transmission power of the fBS 200 based on the information related to the measured signal strength of signals received from the mBS 100.

The mBS 100 may be configured in the same way as a well-known macrocell wireless base station, or may be configured in the same way as the fBS 200.

The UE 300 is an example of the disclosed mobile terminal, and communicates with a core network via the mBS 100 or the fBS 200 by being within the cell formed by the mBS 100 or the fBS 200. A basic configuration and basic functions of the UE 300 will be described with reference to FIGS. 4 and 5.

Figure 4:
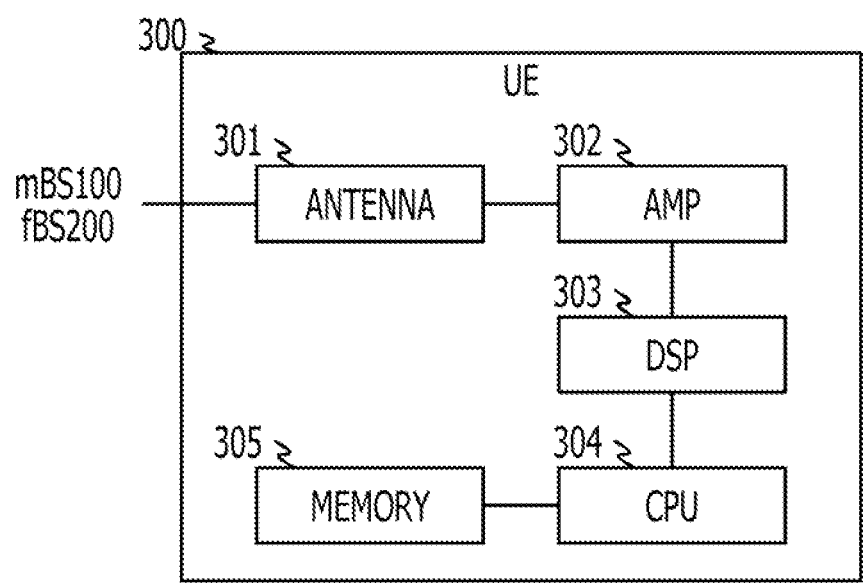
FIG. 4 is a block diagram of a UE hardware configuration.

FIG. 4 is a block diagram of an example of a UE 300 hardware configuration. The UE 300 is equipped with an antenna 301, an amp 302, a DSP 303, a CPU 304, and a memory 305. The antenna 301 receives radio waves transmitted by the mBS 100 or the fBS 200 to conduct communication with the mBS 100 or the fBS 200. The amp 302 amplifies signals transmitted through the antenna 301. The DSP 303 converts signals transmitted to and from the antenna 301, and converts information used in the UE 300. The CPU 304 controls operations of the units included in UE 300 and performs the same functions as the function units illustrated in FIG. 5 by executing programs stored in, for example, the memory 305.

Figure 5:
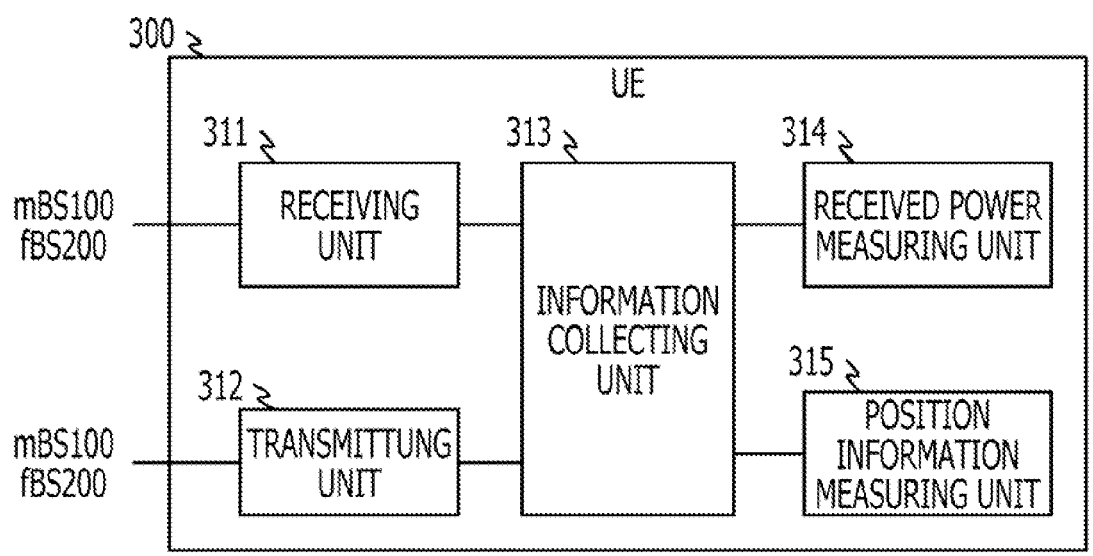
FIG. 5 is a block diagram of functional units included in a UE.

FIG. 5 is a block diagram of functional units included in the CPU 304 of the UE 300. As illustrated in FIG. 5, the CPU 304 of the UE 300 is equipped with a receiving unit 311, a transmission unit 312, an information collecting unit 313, a received power measuring unit 314, and a position information measuring unit 315.

The receiving unit 311 is an interface for transferring signals received from the mBS 100 or the fBS 200 to the information collecting unit 313. The transmission unit 312 is an interface for transmitting information to the mBS 100 or the fBS 200.

The information collecting unit 313 analyzes the signals received from the receiving unit 311, implements operations requested by messages included in the information, and obtains information included in the signals.

The received power measuring unit 314 periodically measures received power from a connected mBS 100 or fBS 200, or from a nearby unconnected mBS 100 or fBS 200. The received power measuring unit 314 transmits the measurement results when a connected mBS 100 or fBS 200 received power measurement result request is received.

The position information measuring unit 315 obtains position information of the UE 300 using GPS. The position information measuring unit 315 measures the UE 300 position information as well as a GPS measurement error indicating the accuracy of the position information. The position information measuring unit 315 transmits the position information and the GPS measurement error information when a request for terminal position information is received from the connected mBS 100 or the fBS 200.

Figure 6:
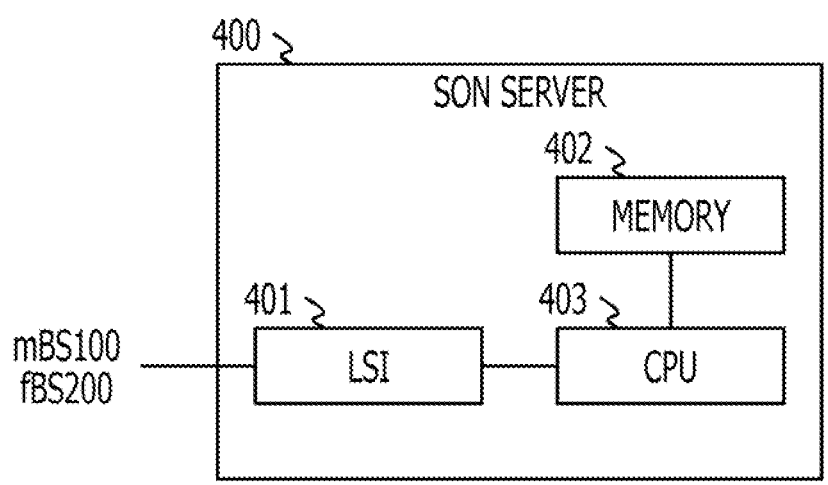
FIG. 6 is a block diagram of a SON server hardware configuration.

A basic configuration and basic functions of the SON server 400 will be described with reference to FIG. 6. FIG. 6 is a block diagram of an example of a SON server 400 hardware configuration. The SON server 400 is equipped with a Large Scale Integration (LSI) 401, a CPU 402, and a memory 403. The LSI 401 is configured to be connected to the mBS 100 and the fBS 200 for communicating information. The CPU 402 controls the operations of the units in the SON server 400 and executes, for example, the operations illustrated in the following embodiments by executing programs stored in, for example, the memory 403.

As described above, the SON server 400 is an example of the disclosed communication control apparatus. However, another apparatus may be used if the above configuration and the functions described below can be achieved. For example, the disclosed communication control apparatus may be a control circuit or the like provided in the mBS 100, or a host node on a network or a control apparatus or the like provided in the host node.

(2) First Embodiment

Figure 7:
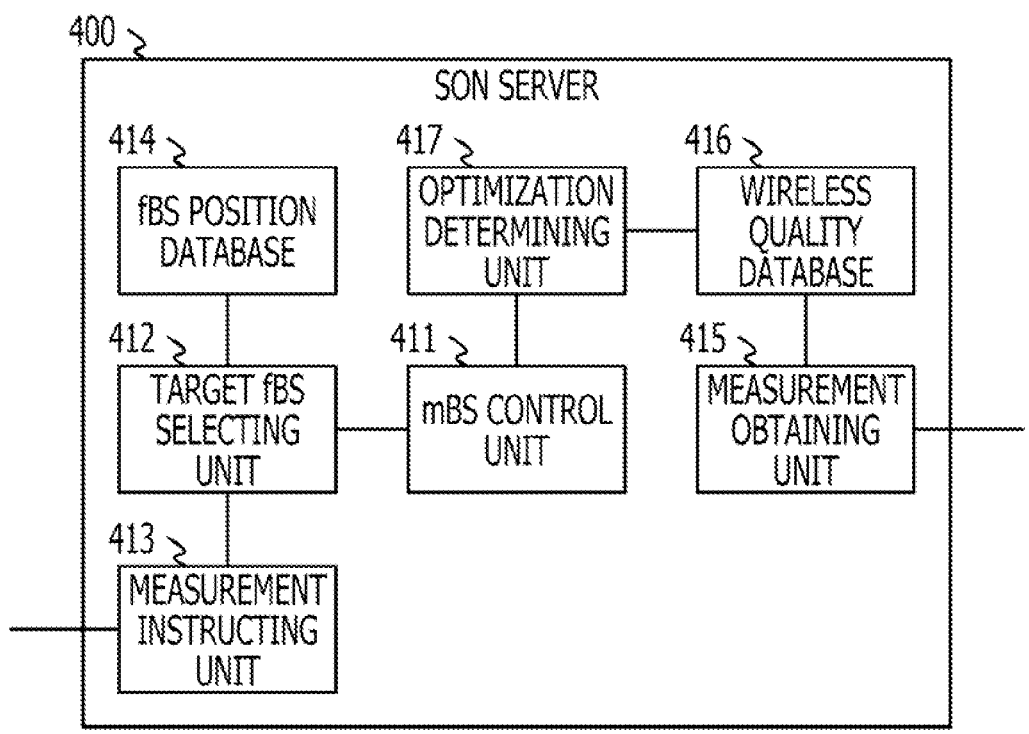
FIG. 7 is a block diagram of functional units included in a SON server according to a first embodiment.

A first embodiment of the mobile communication system 1 will be described with reference to the drawings. Functions of the SON server 400 according to the first embodiment will be described with reference to FIG. 7. FIG. 7 is a block diagram illustrated as function units for the sake of convenience, of functions according to the first embodiment included in the SON server 400. The function units described below may be implemented, for example, by a CPU 402 operation, or may be included in a dedicated processing circuit. Moreover, a database is stored in, for example, the memory 403.

The SON server 400 illustrated in FIG. 7 is equipped with a mBS control unit 411, a target fBS selecting unit 412, a measurement instructing unit 413, a fBS position database 414, a measurement obtaining unit 415, a wireless quality database 416, and an optimization determining unit 417.

The mBS control unit 411 transmits a message to instruct the adjustment of wireless parameters such as mBS 100 transmission power and antenna tilt angles and the like to a target mBS 100 as a trigger to detect problem phenomena such as coverage holes, for example.

Moreover, when the mBS control unit 411 confirms that the wireless parameters have been changed based on reports and the like from the mBS 100, the mBS control unit 411 indicates the mBS 100 whose wireless parameters were changed to the target fBS selecting unit 412.

The target fBS selecting unit 412 receives the information indicating the mBS 100 whose wireless parameters have been changed from the mBS control unit 414, and selects a fBS 200 present in an area overlapped by the coverage of the adjusted mBS 100 and an adjacent mBS 100. For example, the target fBS selecting unit 412 selects a fBS 200 present in an area overlapped by the coverage of the adjusted mBS 100 and an adjacent mBS 100, by referring to the fBS position database 414. The target fBS selecting unit 412 can determine whether the fBS 200 is near the edge of the mBS 100 coverage based on the previous measurement results from the fBS 200. Additionally, the target fBS selecting unit 412 may select only the fBS 200 determined to be near the edge as the target for measurement instructions, for example.

A configuration example of the fBS position database 414 will be described with reference to FIG. 8. FIG. 8 illustrates an example of data stored in the fBS position database 414. As illustrated in FIG. 8, the fBS position database 414 stores identification information (ID), position information, and information on the mBS's 100 whose coverage areas overlap fBS's 200, about each of the fBS's 200 controlled by the SON server 400.

The position information is, for example, a combination of latitude and longitude coordinates and is stored at the installation of each fBS 200 by registration by an operator, or by registration of position information obtained by a GPS function included in the fBS 200. The position information may also be determined from transmission signal strength from a nearby mBS 100 received by the fBS 200. The overlapping mBS 100 may be determined from the abovementioned position information. Further, the mBS 100 with the strongest received power may be registered when measuring the signal strength of a mBS 100 near the target fBS 200. According to this method, the mBS 100 whose coverage overlaps the target fBS 200 may be learned.

The target fBS selecting unit 412 indicates the selected fBS 200 to the measurement instructing unit 413. The measurement instructing unit 413 gives an instruction to measure the signal strength of the overlapping mBS 100 to the fBS 200 selected by the target fBS selecting unit 412.

The measurement obtaining unit 415 receives measurement information from the fBS 200 and updates the wireless quality database 416 based on the received information. If a change occurs, the overlapping mBS 100 information related to the fBS 200 stored in the fBS position database 414 may also be updated.

The following describes a configuration example of the wireless quality database 416 with reference to FIGS. 9A and 9B. FIGS. 9A and 9B illustrate examples of data stored in a wireless quality database.

As illustrated in FIG. 9A, the wireless quality database 416 stores information wireless quality measured by the fBS 200 and the like as well as measured position information about each mBS 100 controlled by the SON server 400.

In the example in FIG. 9A, although wireless quality of the mBS 100 with the largest received power at each measured position is stored, the measured received power values of multiple mBS's 100 may also be stored for one measurement position.

As illustrated in FIG. 9B, the wireless quality database 416 may also store wireless quality of the mBS 100 before and after communication parameters are adjusted due to mBS control unit 411 instructions. With this type of configuration, the effect of the communication parameter adjustment on the fBS 200 operation can be understood by comparing the wireless quality before and after the mBS 100 communication parameter adjustment at the same measurement position since no changes in the position occurred. Since the fBS 200 position has not changed, fBS identification information may be used in place of the position information in FIG. 9B.

The optimization determining unit 417 determines whether the problem phenomena are eliminated or not based on the wireless quality database 416 updated with the measurement information from the fBS 200. If the problem phenomena are not eliminated, an instruction is sent to the mBS control unit 411 to adjust the mBS 100 wireless parameters again.

Figure 10:
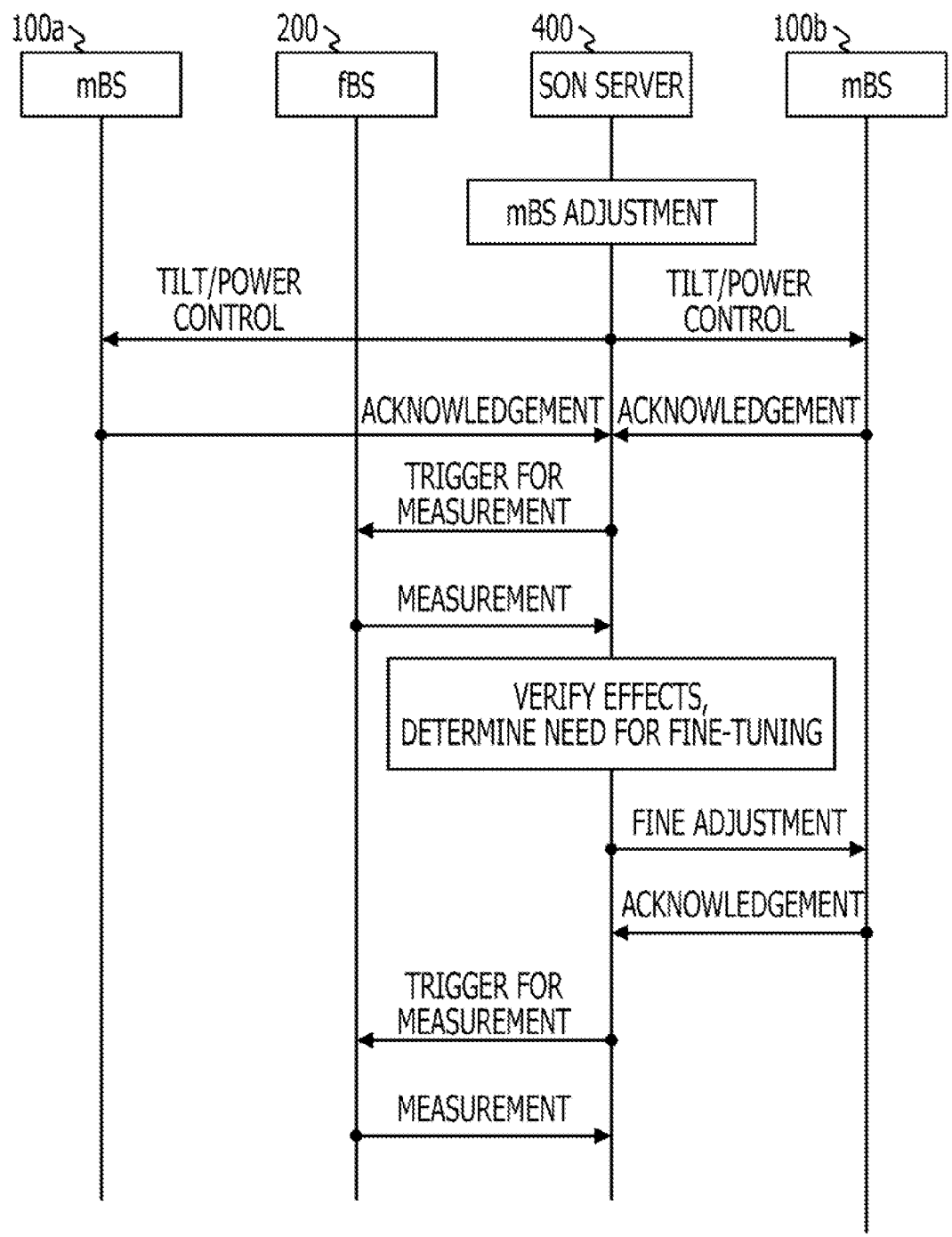
FIG. 10 is a sequence diagram illustrating the flow of mobile communication system operations according to the first embodiment.

Operations of the units in the mobile communication system 1 according to the first embodiment will be described with reference to FIG. 10. FIG. 10 is a sequence diagram indicating the flow of mobile communication system operations according to the first embodiment.

As illustrated in FIG. 10, when the SON server 400 decides to implement optimization of the communication parameters such as transmission power and tilt angle and the like of the mBS 100, the SON server instructs the implementation of the adjustment and indicates adjustment values to the mBS 100a and the mBS 100b. The mBS 100a and the mBS 100b send back an acknowledgment message after adjusting the communication parameters.

Next, the SON server 400 instructs the fBS 200 overlapped by the mBS 100a and the mBS 100b to measure the signal strength of the mBS 100a and the mBS 100b after the adjustment. The fBS 200 measures the signal strength and reports the results to the SON server 400.

The SON server 400 verifies the effects of the communication parameter adjustment conducted by the mBS 100a and the mBS 100b from the reported measurement results. As a result of the verification, the SON server 400 determines whether further adjustment or fine-tuning of the communication parameters is necessary, and instructs readjustment of the parameters if readjustment is considered necessary.

After the readjustment, the SON server 400 may reinstruct the fBS 200 to measure the signal strength of the mBS 100 that conducted the readjustment. The SON server 400 then may determine whether or not further adjustment or fine-tuning of the communication parameters are necessary from the reported measurement results, and then reinstruct parameter adjustment if such readjustment is considered necessary.

Figure 11:
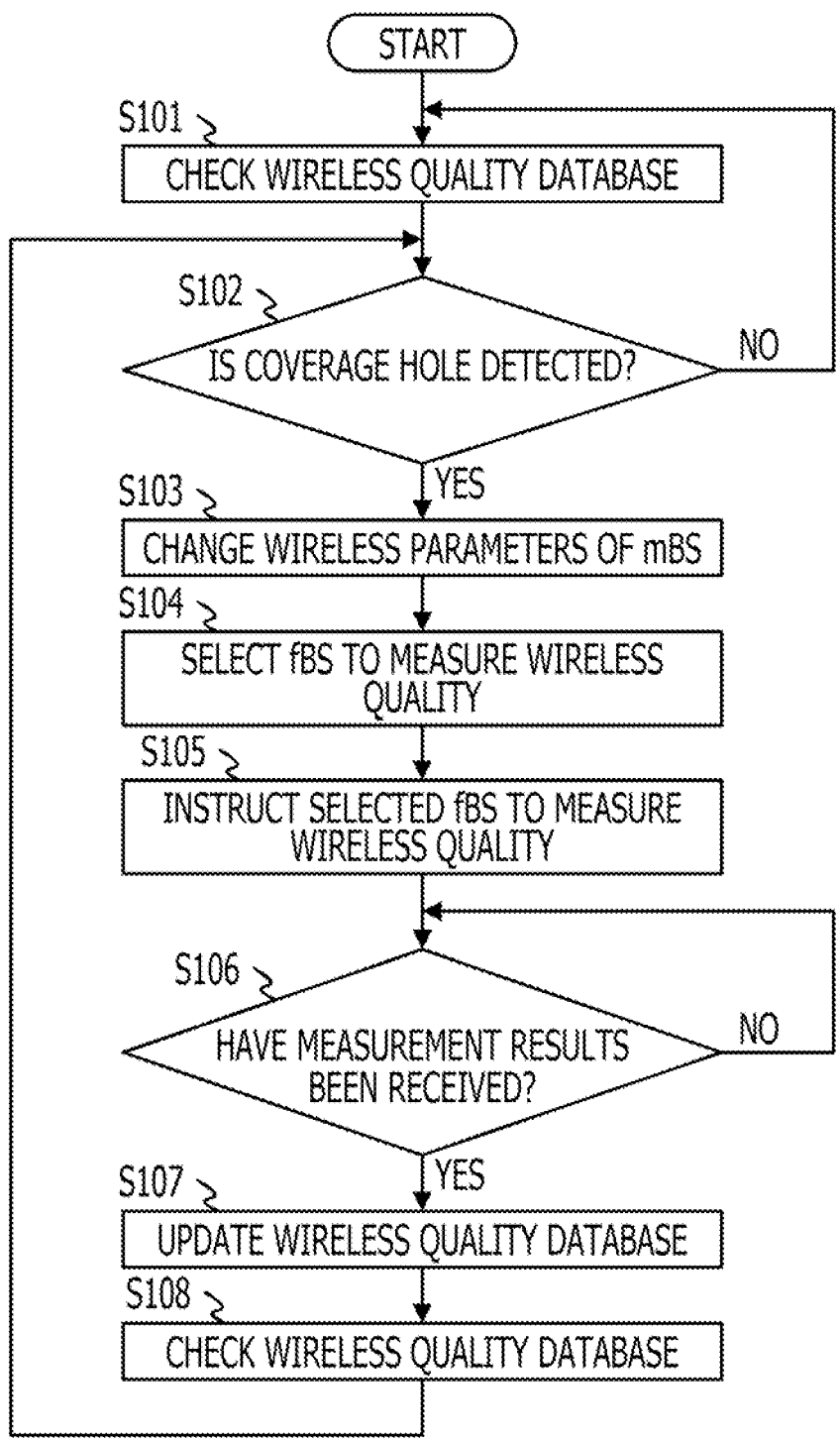
FIG. 11 is a flow chart illustrating the flow of operations of a SON server according to the first embodiment.

The flow of operations of the SON server 400 according to the first embodiment described with reference to FIG. 10 will be described in details with reference to the flow chart of FIG. 11.

The SON server 400 refers to the wireless quality database 416 to periodically confirm whether or not coverage holes have formed in any of the mBS 100 coverage areas controlled by the SON server 400 (step S101).

If a coverage hole is detected (step S102: Yes), the mBS control unit 411 of the SON server 400 instructs the controlled mBS 100 to conduct wireless parameter adjustment to compensate for the detected coverage hole (step S103).

Besides detecting coverage holes, the mBS control unit 411 may give wireless parameter adjustment instructions when it is determined that wireless parameter adjustment such as transmission power and tilt angle for the mBS 100 is desired and/or required. For example, the mBS control unit 411 may give instructions for conducting wireless parameters adjustment when instructed through an operation by an operator administering the wireless communication system 1. Furthermore, the mBS control unit 411 may give instructions for conducting wireless parameters adjustment when the wireless quality of the mBS 200 stored in the wireless quality database 416 by the optimization determining unit 417 is determined to be below a certain quality level and/or threshold. Further, wireless parameters adjustment instructions may be provided as a trigger when it is determined that wireless quality has deteriorated and desired improvements have not been achieved by comparing the wireless quality measured by the same fBS 200 and the wireless quality measured in the same position before and after the communication parameter adjustment of the mBS 100.

After receiving an adjustment completed report from the mBS 100, the mBS control unit 411 indicates the mBS 100 whose wireless parameters were changed to the target fBS selecting unit 412.

For example, the target fBS selecting unit 412 selects the mBS 100 whose wireless parameters were changed or a nearby fBS 200 present in an area overlapped by the coverage of the mBS 100, by referring to the fBS position database 414 (step S104).

The target fBS selecting unit 412 indicates the selected fBS 200 to the measurement instructing unit 413. The measurement instructing unit 413 gives an instruction to measure the signal strength of the overlapping mBS 100 to the fBS 200 selected by the target fBS selecting unit 412 (step S105).

The measurement obtaining unit 415 of the SON server 400 that receives the measurement results from the fBS 200 updates the wireless quality database 416 based on the measurement results (step S107).

The optimization determining unit 417 refers to the updated wireless quality database 416 to determine whether the problem is eliminated by compensating for the coverage hole and the like (step S108). When a coverage hole or the like is further detected after the adjustment instructions (step S102: Yes), the optimization determining unit 417 may instruct the mBS control unit 411 to reinstruct wireless parameters adjustment of the mBS 100 (step S103).

Figure 12:
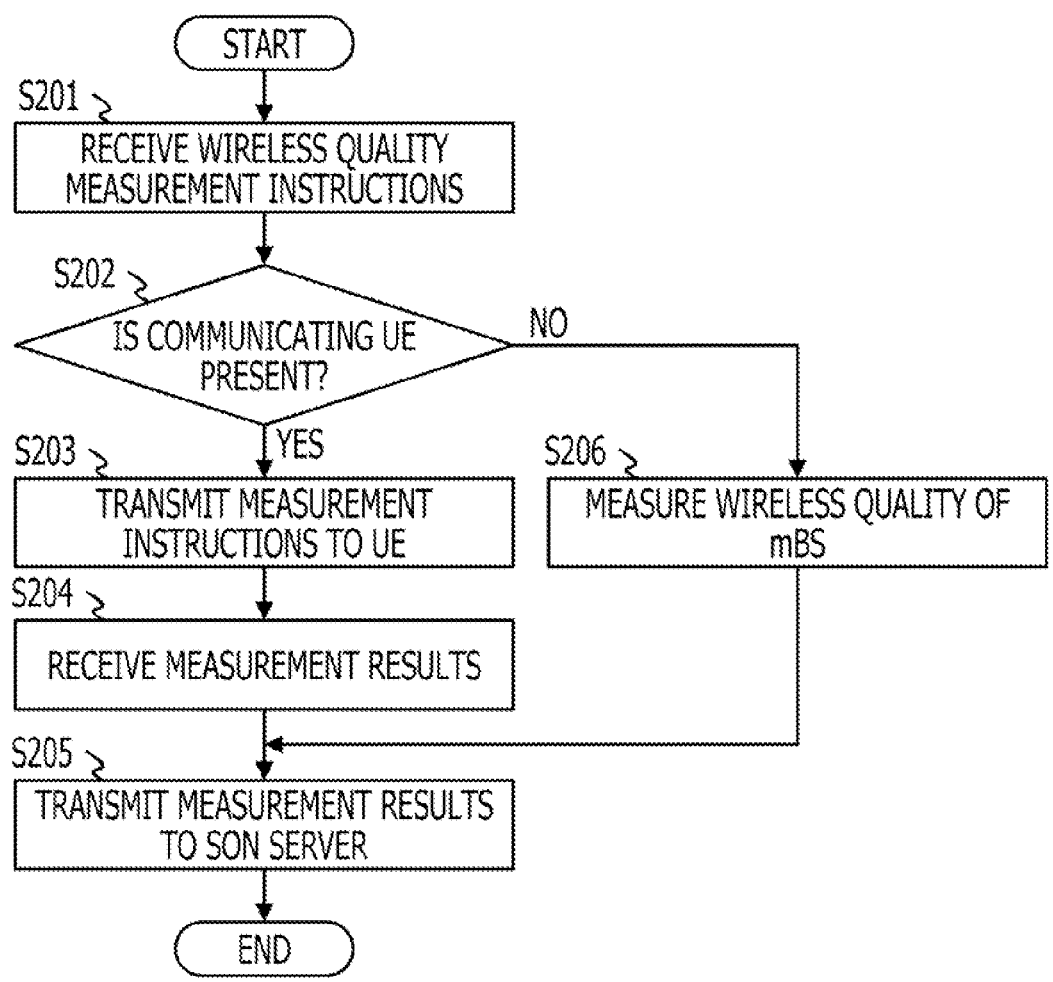
FIG. 12 is a flow chart illustrating the flow of operations of a fBS according to the first embodiment.

In the flow of operations according to the first embodiment, the fBS 200 that received the instructions from the SON server 400 may not be able to communicate with the UE 300 connected thereto while the fBS 200 is measuring the signal strength of the mBS 100. As a result, the fBS 200 may substitute measuring the signal strength of the mBS 100 with the UE 300 connected thereto in place of measurement by the fBS 200's measurement unit 215. The flow of operations of the fBS 200 in this case is described with reference to the flow chart in FIG. 12.

When the fBS 200 receives an instruction to measure the signal strength of the mBS 100 from the SON server 400 (step S201), and a communicating UE 300 is present (step S202: Yes), the fBS 200 gives the UE 300 an instruction to measure the signal strength of the mBS 100 (step S203).

Conversely, if no communicating UE 300 is present (step S202: No), measurement of the signal strength of the mBS 100 is conducted by the measuring unit 215 (step S206).

After receiving the measurement results from the UE 300 (step S204), or after conducting measurement by the measuring unit 215 (step S206), the fBS 200 transmits the measurement results to the SON server 400 (step S205).

Measurement instructions to the UE 300 may be implemented when, for example, the number of fBS's 200 overlapped by the selected mBS 100 is small, or when it is determined that suitable measurement results cannot be obtained.

According to the first embodiment of the mobile communication system 1 described above, measurement of signal strength is conducted, for example, by a fBS 200 fixedly provided in a residence or the like inside the coverage area of a mBS 100 to detect abnormalities such as coverage holes in the mBS 100 coverage area. The fBS 200 uses broadband wiring (Asymmetric Digital Subscriber Line (ADSL) or optical fiber) installed and introduced into a residence to connect to a wireless network.

By using the fBS 200 in this way, effects on the signal strength due to mBS 100 wireless parameter changes can be accurately monitored by periodically measuring the signal strength of the mBS 100. As a result, the frequency of causing the UE 300 to measure the wireless quality and report the measurement results can be suppressed and thus consumption of the wireless resources in the UE 300 used for measuring and reporting the measurement results can be reduced.

A fBS 200 generally used by a SON has the function of measuring the signal strength of surrounding wireless base stations (i.e., the mBS 100 and the like) received through an antenna for conducting the automatic setting of wireless parameters such as its own transmission power. As a result, by using these functions, it is possible to conduct the operations according to the abovementioned first embodiment without additional configurations.

The target fBS selecting unit 412 may select a fBS 200 provided near the boundary of a mBS 100 cell whose wireless parameters have changed based on position information when the fBS 200 is instructed to conduct measurements. By making a selection in this way, changes in the signal strength at a cell boundary where the effects due to wireless parameter changes are seen more easily can be verified with high accuracy.

Moreover, the fBS 200 may also adjust its own wireless parameters in response to the measured signal strength when measuring the signal strength of the mBS 100 whose wireless parameters have changed. With this configuration, the fBS 200 wireless parameters can be quickly made to follow the new wireless parameters of the mBS 100 to allow for the mutual suppression of radio wave interference and the like.

(3) Second Embodiment

A second embodiment of the mobile communication system 1 will be described with reference to the drawings. In the second embodiment, a SON server 400' that replaces the SON server 400 of the first embodiment gives instructions to the fBS 200 overlapped inside the coverage area of the mBS 100 whose wireless parameters have been changed, and to a UE 300 connected to the mBS 100, to conduct measurements.

Figure 13:
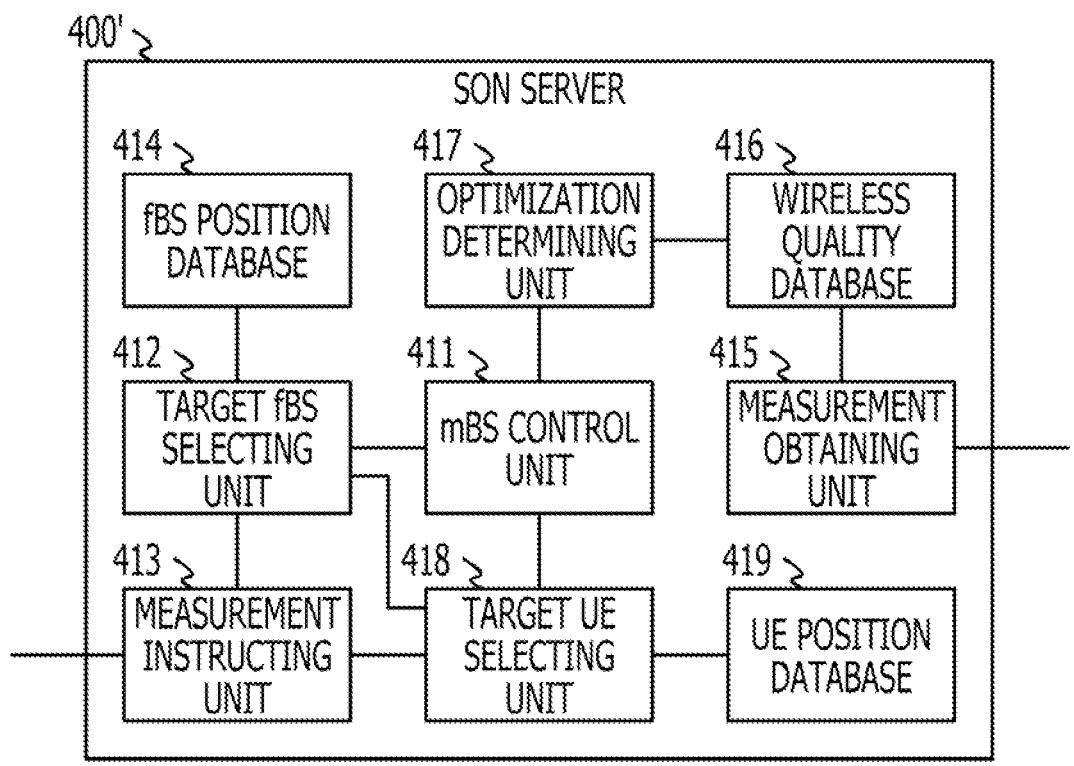
FIG. 13 is a block diagram of functional units included in a SON server according to a second embodiment.

Functions included in the SON server 400' of the second embodiment will be described with reference to FIG. 13. FIG. 13 is a block diagram illustrated as function units for the sake of convenience, of functions according to the first embodiment included in the SON server 400'. Function units that are the same as those included in the SON server 400 according to the first embodiment illustrated in FIG. 7 have the same reference numbers and their description will be omitted.

The SON server 400' illustrated in FIG. 13 is equipped with the mBS control unit 411, the target fBS selecting unit 412, the measurement instructing unit 413, the fBS position database 414, the measurement obtaining unit 415, the wireless quality database 416, the optimization determining unit 417, a target UE selecting unit 418, and a UE position database 419.

The target UE selecting unit 418 selects a UE 300 present in the coverage area of the mBS 100 whose parameters have been changed and in the coverage area of a nearby mBS 100 by referring to the UE position database 419. The target UE selecting unit 418 selects the UE 300, for example, by referring to UE 300 position information stored in the UE position database 419.

The UE position database 419 will be described with reference to FIG. 14. FIG. 14 illustrates an example of data stored in the UE position database 419. As illustrated in FIG. 14, the UE position database 419 stores identification information, position information, and connected mBS 100 information for each UE 300. The UE position database 419 requests, for example, each UE 300 to transmit position information obtained by using GPS, and then registers the transmitted position information.

By making a selection in this way, a mBS 100 whose wireless parameters have changed desirably, and a UE 300 connected to a nearby mBS 100 can be selected. The target UE selecting unit 418 then notifies the selected UE 300 information to the measurement instructing unit 413.

Figure 15:
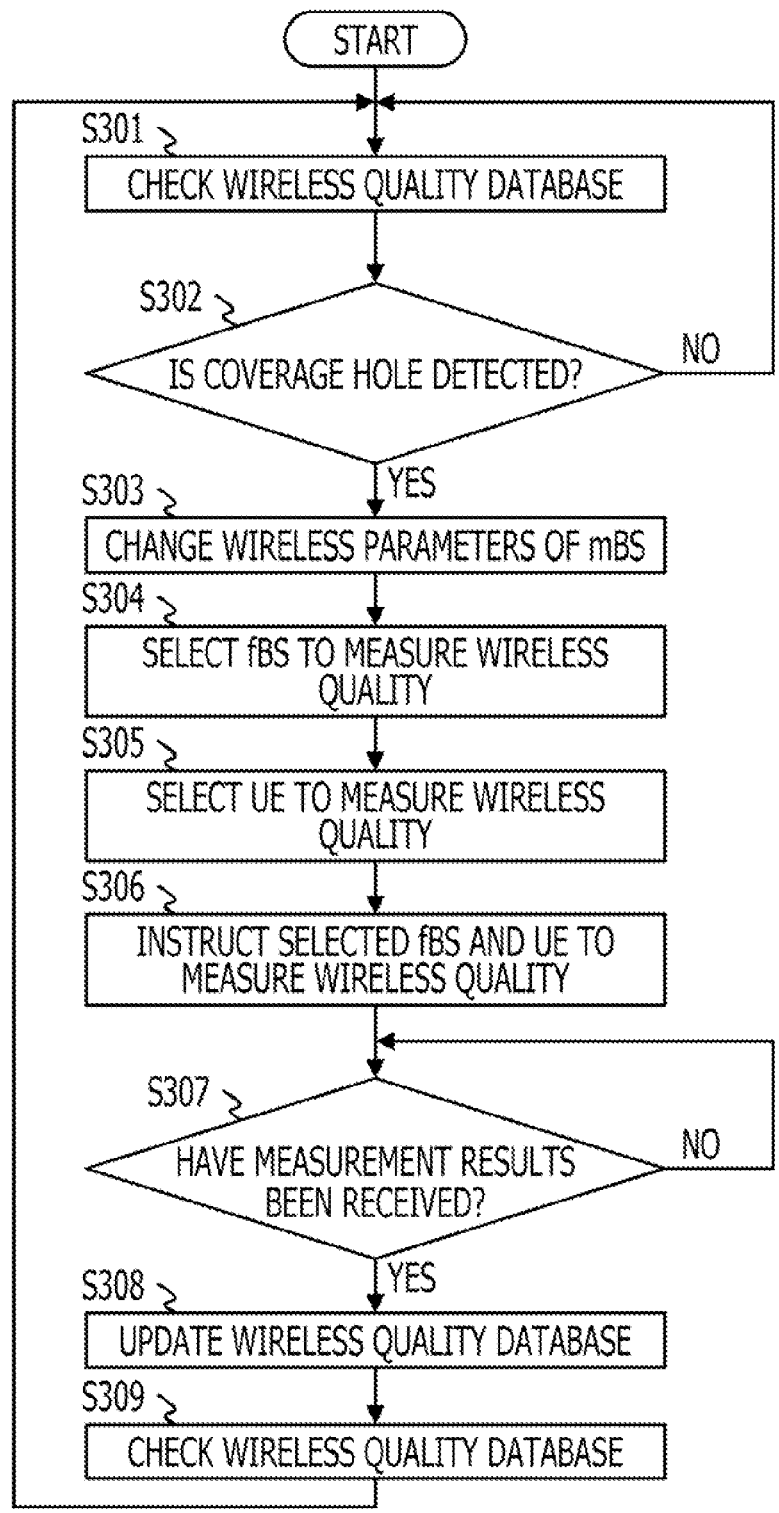
FIG. 15 is a flow chart illustrating the flow of operations of a SON server according to the second embodiment.

The flow of operations of the SON server 400' according to the second embodiment will be described in details with reference to the flow chart of FIG. 15.

The SON server 400' refers to the wireless quality database 416 to periodically confirm whether or not coverage holes have formed in any of the mBS 100 coverage areas controlled by the SON server 400' (step S301).

If a coverage hole is detected (step S302: Yes), the mBS control unit 411 of the SON server 400' instructs the controlled mBS 100 to conduct wireless parameters adjustment to compensate for the detected coverage hole (step S303).

Besides detecting coverage holes, the mBS control unit 411 may give wireless parameter adjustment instructions when it is determined that wireless parameter adjustment such as transmission power and tilt angle for the mBS 100 are desired and/or required. For example, the mBS control unit 411 may give instructions for conducting wireless parameter adjustment when instructed through an operation by an operator administering the wireless communication system 1. Furthermore, the mBS control unit 411 may give instructions for conducting wireless parameter adjustment when the wireless quality of the mBS 200 stored in the wireless quality database 416 by the optimization determining unit 417 is determined to be below a certain quality level and/or threshold. Further, wireless parameters adjustment instructions may be provided as a trigger when it is determined that wireless quality has deteriorated and desired improvements have not been achieved by comparing the wireless quality measured by the same fBS 200 and the wireless quality measured in the same position before and after the communication parameter adjustment of the mBS 100.

After receiving an adjustment completed report from the mBS 100, the mBS control unit 411 indicates the mBS 100 whose wireless parameters have been changed to the target fBS selecting unit 412 and the target UE selecting unit 418.

For example, the target fBS selecting unit 412 selects a fBS 200 in an area overlapped by the coverage areas of the mBS 100 whose wireless parameters have been changed and an adjacent mBS 100, by referring to the fBS position database 414 (step S304).

The target UE selecting unit 418 selects a UE 300 present in the coverage areas of the mBS 100 whose parameters have been changed and a nearby mBS 100 by referring to the UE position database 419 (step S305).

The target fBS selecting unit 412 indicates the selected fBS 200 to the measurement instructing unit 413. The target UE selecting unit 418 indicates the selected UE 300 to the measurement instructing unit 413. The measurement instructing unit 413 transmits an instruction message to measure the signal strength of the mBS 100 whose wireless parameters have been changed, to the fBS 200 selected by the target fBS selecting unit 412, and to the UE 300 selected by the target UE selecting unit 418 (step S306).

The measurement obtaining unit 415 of the SON server 400' that receives the measurement results from the fBS 200 and the UE 300 updates the wireless quality database 416 based on the measurement results (step S308).

The optimization determining unit 417 refers to the updated wireless quality database 416 to determine whether the problem was eliminated by compensating the coverage hole and the like (step S309). When a coverage hole or the like is further detected after the adjustment instructions (step S302: Yes), the optimization determining unit 417 may instruct the mBS control unit 411 to reinstruct wireless parameter adjustment of the mBS 100 (step S303).

According to the second embodiment described above, signal strength can be measured and collected using a UE 300 even when suitable measurement of the mBS 100 signal strength cannot be conducted due to the number of fBS 200 installations or fBS 200 arrangements and the like. As a result, even if fBS's 200 are not widely dispersed, effects similar to the effects of the first embodiment can be achieved.

In the second embodiment, the target UE selecting unit 418 may be notified about the selected fBS 200 by the target fBS selecting unit 412, and may select a UE 300 that is not positioned near the selected fBS 200 as the UE to send measurement instructions to. The target UE selecting unit 418 may determine whether the UE 300 is near the fBS 200 by comparing selected fBS 200 position information stored in the fBS position database 414 with UE 300 position information stored in the UE position database 419. Moreover, the target UE selecting unit 418 may make the determination based on whether or not the UE 300 receives transmission radio waves from the selected fBS 200.

By making the selection in this way, measurement of the signal strength using a UE 300 at a position where the fBS 200 is not arranged is possible and the accuracy of the obtained information about the signal strength of the mBS 100 coverage area can be improved.

(4) Third Embodiment

A third embodiment of the mobile communication system 1 will be described with reference to the drawings. In the third embodiment, a SON server 400" that replaces the SON server 400 of the first embodiment is provided.

Figure 16:
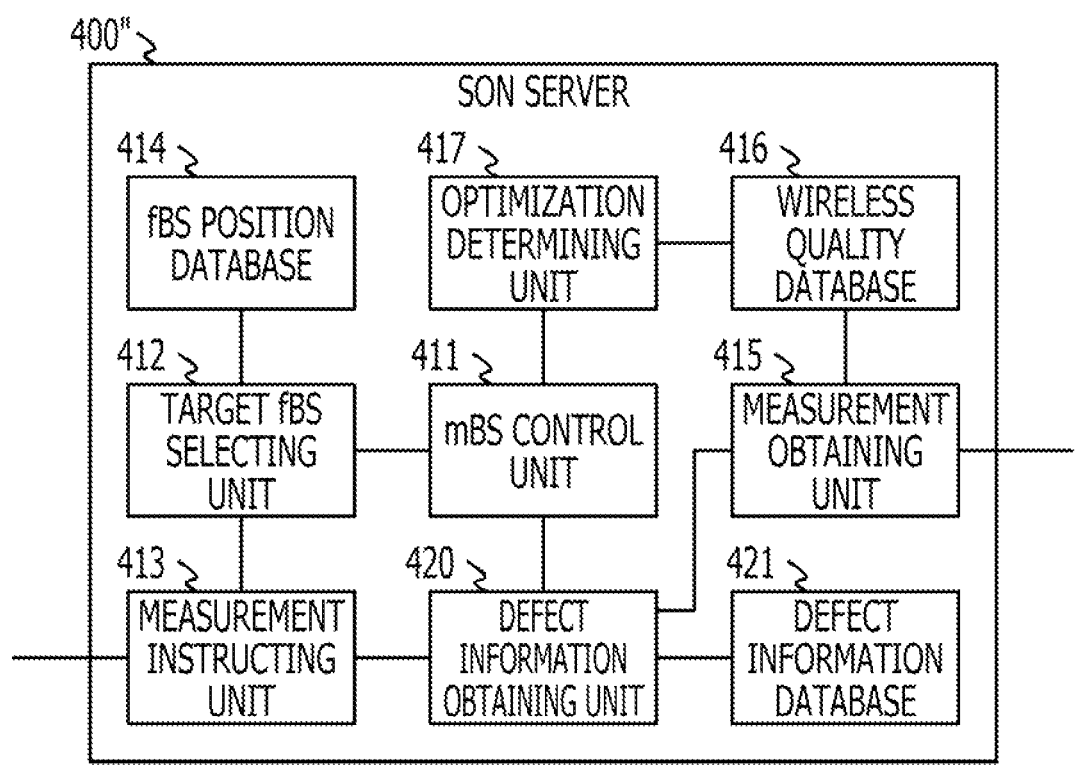
FIG. 16 is a block diagram of functional units included in a SON server according to a third embodiment.

Functions included in the SON server 400" of the third embodiment will be described with reference to FIG. 16. FIG. 16 is a block diagram illustrated as function units for the sake of convenience, of functions according to the first embodiment included in the SON server 400". Function units that are the same as those included in the SON server 400 according to the first embodiment illustrated in FIG. 7 have the same reference numbers and their description will be omitted.

The SON server 400" illustrated in FIG. 16 is equipped with the mBS control unit 411, the target fBS selecting unit 412, the measurement instructing unit 413, the fBS position database 414, the measurement obtaining unit 415, the wireless quality database 416, the optimization determining unit 417, a defect information obtaining unit 420, and a defect information database 421.

The defect information obtaining unit 420 obtains defect information on the transmission radio waves of the mBS 100 via the mBS 100, and registers the defect information in the defect information database 421. In the third embodiment, the UE 300 determines that some kind of defect has occurred in the mBS 100 when the quality and the like of the transmission radio waves from a mBS 100 connected thereto is badly deteriorated, or when a wireless link is disconnected. The UE 300 then transmits the detected position information where the defect occurred and the contents of the defect to the SON server 400" via the mBS 100. The defect information obtaining unit 420 receives and collects the defect information transmitted by the UE 300.

When the defect information obtaining unit 420 detects the occurrence of a defect, the defect information obtaining unit 420 instructs the mBS control unit 411 to adjust the wireless parameters to compensate for the defect.

The defect information database 421 will be described with reference to FIG. 17. FIG. 17 illustrates an example of data stored in the defect information database 421. As illustrated in FIG. 17, the defect information database 421 stores the position information of the measured position and the defect information of the transmission radio waves from the mBS 100. The position information is, for example, registered as position information of the measured signal strength when the occurrence of a defect is detected. The defect information database 421 may store information indicating the position information of the observed defect as well as the mBS 100 whose coverage area covers the position indicated in the position information. The defect information includes, for example, conditions of disconnected links or signal quality deterioration related to the measured signal strength.

Figure 18:
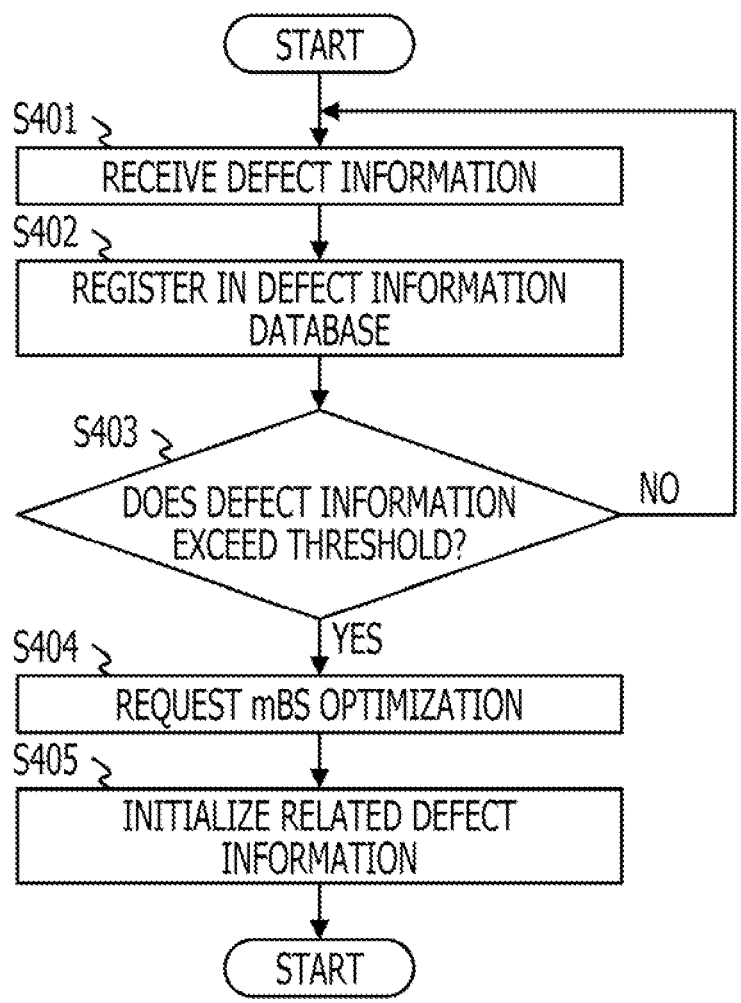
FIG. 18 is a flow chart illustrating the flow of operations of a SON server according to the third embodiment.

The flow of operations of the SON server 400" according to the third embodiment will be described in detail with reference to the flow chart of FIG. 18.

When the SON server 400" receives the defect information via the mBS 100 (step S401), the SON server 400" registers the defect information in the defect information database 421 (step S402). If the defect information stored in the defect information database 421 exceeds a certain threshold (step S403: Yes), the mBS control unit 411 determines that some kind of defect has occurred at the position indicated in the defect information. The state of the defect information exceeding the certain threshold is preferably set as a state in which the occurrence of a defect can be appropriately determined based on the defect information, when, for example, the number of link disconnections or the amount of signal quality deterioration defect information in the coverage area of the mBS 100 exceeds a certain threshold.

When it is determined that some kind of defect has occurred, the mBS control unit 411 instructs the mBS 100 whose coverage area includes the defect occurrence position or a nearby mBS 100 to adjust the wireless parameters to compensate for the defect (step S404). Next, the defect information obtaining unit 420 initializes the defect information related to the wireless parameter adjustment instructions and stored in the defect information database 421 (step S405).

In the third embodiment described above, the SON server 400" instructs adjustment of the wireless parameters of the mBS 100 to compensate for the defect by using the defect information detected by the UE 300. Therefore, defects can be desirably compensated when a defect occurs.

The present invention is not limited to the abovementioned embodiments, and various modifications within the scope and gist of the present invention as understood from the scope of the claims and the description may be made, and a mobile communication system, a communication control apparatus, a communication control system, and a wireless base station included in such modifications may also be included within the technical scope of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A mobile communication system comprising:
   a first wireless base station;
   a second wireless base station located within a service area of the first wireless base station and configured to have a service area smaller than the service area of the first wireless base station;
   a wireless terminal configured to couple to the first or second wireless base stations; and
   a communication control apparatus configured to control the first or second wireless base stations;
   wherein
   the communication control apparatus
   controls adjustment of communication parameters of the first wireless base station,
   instructs the second wireless base station located inside the service area of the first wireless base station whose communication parameters have been changed to measure a wireless quality of the first wireless base station when changes to the communication parameters of the first wireless base station have occurred,
   obtains the wireless quality measured by the second wireless base station, and
   determines whether the communication parameters of the first wireless base station were adjusted based on the wireless quality; and
   the second wireless base station
   receives a measurement instruction to measure the wireless quality from the communication control apparatus;
   measures, at a location of the second wireless base station, the wireless quality of the first wireless base station indicated in the measurement instruction from the communication control apparatus; and
   transmits the wireless quality measured at the location of the second wireless base station to the communication control apparatus.

2. The mobile communication system according to claim 1, wherein
   the communication control apparatus
   instructs the wireless terminal coupled to the first wireless base station affected by the communication parameter changes, to measure the wireless quality of the first wireless base station, and
   obtains the wireless quality measured by the wireless terminal.

3. The mobile communication system according to claim 2, wherein
   the communication control apparatus
   instructs the wireless terminal not receiving radio waves from the second wireless base station among the wireless terminals coupled to the first wireless base station affected by the communication parameter changes, to measure the wireless quality of the first wireless base station.

4. The mobile communication system according to claim 1, wherein
   the communication control apparatus
   determines whether further adjustment of the communication parameters is necessary by comparing the wireless quality before and after the changes to the communication parameters of the first wireless base station.

5. The mobile communication system according to claim 1, wherein
   the communication control apparatus
   instructs the second wireless base station, determined according to the wireless quality before the changes to the communication parameters of the first wireless base station when the changes to the communication parameters affect the wireless quality, to measure the wireless quality of the first wireless base station.

6. The mobile communication system according to claim 1, wherein
   the communication control apparatus is further configured to obtain defect information related to the first wireless base station from the wireless terminal, and
   the communication control apparatus
   instructs the second wireless base station located at a defect occurrence location identified in the defect information to measure the wireless quality of the first wireless base station.

7. A communication control apparatus controlling a first wireless base station and a second wireless base station located inside a service area of the first wireless base station and having a service area smaller than the service area of the first wireless base station, the communication control apparatus comprising:
   a communication interface; and
   a processor configured
   to control adjustment of communication parameters of the first wireless base station;
   to control the communication interface to instruct the second wireless base station located inside the service area of the first wireless base station whose communication parameters have been changed, to measure, at a location of the second wireless base station, a wireless quality of the first wireless base station when changes to the communication parameters of the first wireless base station have occurred;

to control the communication interface to obtain the wireless quality measured by the second wireless base station; and to determine whether the communication parameters of the first wireless base station were adjusted based on the wireless quality measured at the location of the second wireless base station.

8. A wireless base station located in a service area of another wireless base station and having a service area smaller than the service area of the another wireless base station, the wireless base station comprising:

a receiver configured to receive a wireless quality measurement instruction, a processor configured to measure, at a location of the wireless base station, the wireless quality of the another wireless base station indicated in the measurement instruction; and a transmitter configured to transmit the wireless quality measured at the location of the wireless base station.

9. The wireless base station according to claim 8, wherein the wireless base station is further configured to instruct a wireless terminal coupled thereto to measure the wireless quality of the another wireless base station, and to receive the wireless quality measured by the wireless terminal, and the wireless base station transmits the wireless quality measured by the wireless terminal.

10. The wireless base station according to claim 8, wherein the wireless base station is further configured to change the communication parameters of the wireless base station based on the measured wireless quality of the another wireless base station.

11. The mobile communication system according to claim 1, wherein, when changes to the communication parameters of the first wireless base station have occurred, the communication control apparatus instructs a second wireless base station located near the boundary of the service area of the first wireless base station among the second wireless base stations located in the service area of the first wireless base station whose communication parameters have been changed, to measure the wireless quality of the first wireless base station.

12. The mobile communication system according to claim 1, wherein the second wireless base station acquires measurement information from the wireless terminal when the wireless terminal is communicating via the second wireless base station;

measures, at the location of the second wireless base station, the wireless quality of the first wireless base station indicated in the measurement instruction from the communication control apparatus while the wireless terminal is not communicating via the second wireless base station; and transmits the wireless quality measured at the location of the second wireless base station or the measurement information to the communication control apparatus.

13. The communication control apparatus according to claim 7, wherein the processor instructs the second wireless base station to acquire measurement information from a wireless terminal when the wireless terminal is communicating via the second wireless base station;

measures, at the location of the second wireless base station, the wireless quality of the first wireless base station indicated in the measurement instruction from the communication control apparatus while the wireless terminal is not communicating via the second wireless base station; and transmits the wireless quality measured at the location of the second wireless base station or the measurement information to the communication control apparatus.

* * * * *